No. 865,162. PATENTED SEPT. 3, 1907.
W. H. COLDWELL.
TRACTION AND LAWN ROLLING ROLLER.
APPLICATION FILED MAY 16, 1907.
2 SHEETS—SHEET 1.
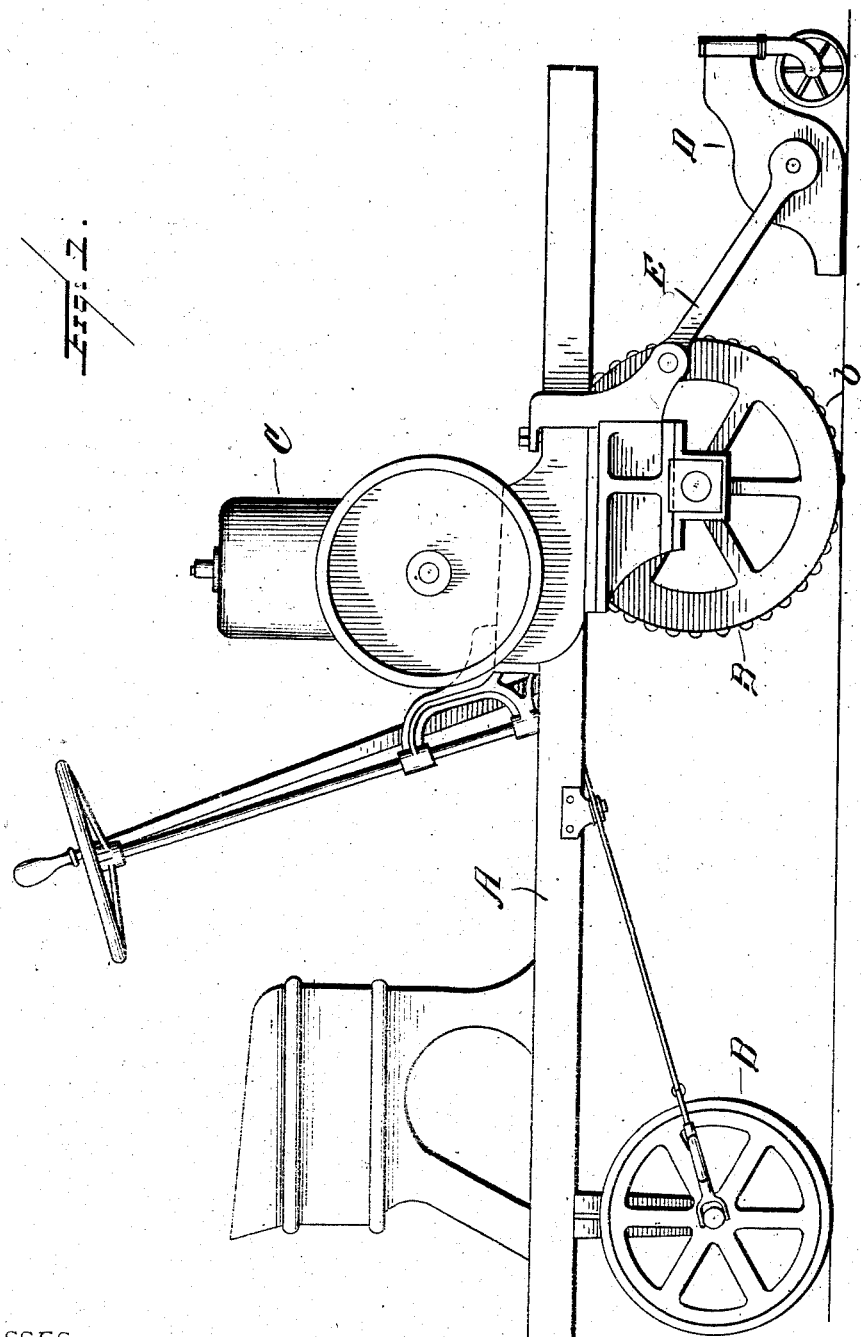
WITNESSES:
INVENTOR
William H. Coldwell
BY
Attorneys No. 865,162. PATENTED SEPT. 3, 1907.
W. H. COLDWELL.
TRACTION AND LAWN ROLLING ROLLER.
APPLICATION FILED MAY 16, 1907.
2 SHEETS—SHEET 2.
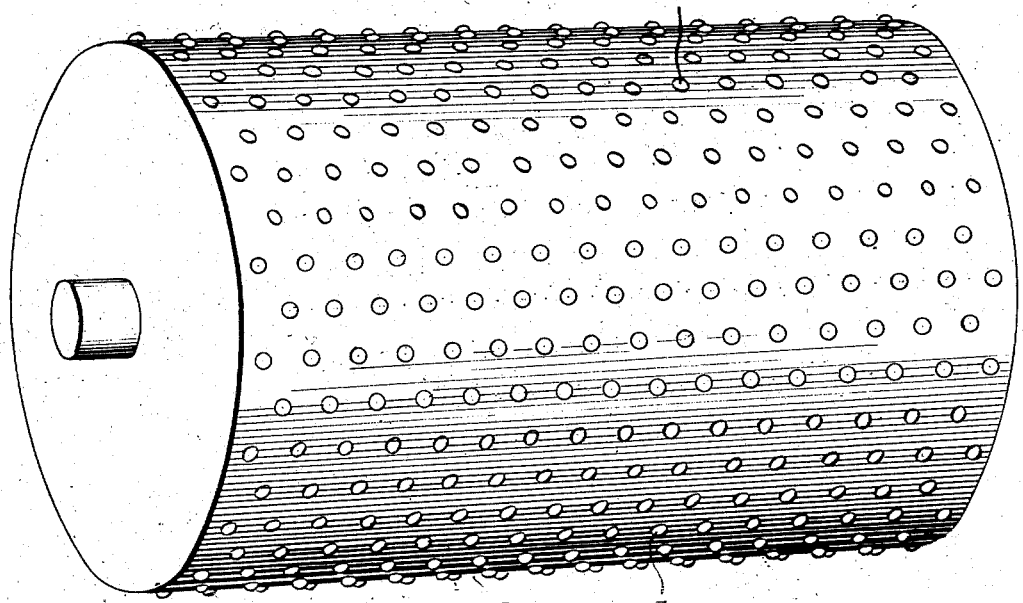
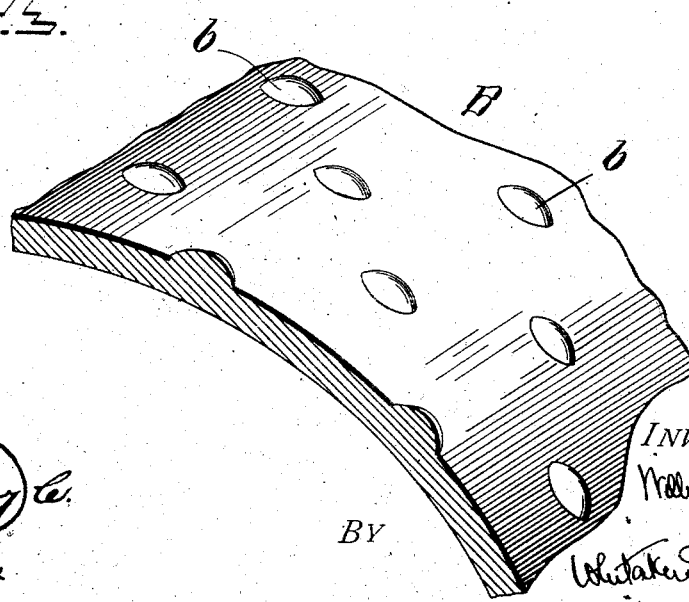
WITNESSES:
INVENTOR.
BY
Attorneys.

UNITED STATES PATENT OFFICE.

WILLIAM H. COLDWELL, OF NEWBURGH, NEW YORK.

TRACTION AND LAWN-ROLLING ROLLER.

No. 865,162. Specification of Letters Patent. Patented Sept. 3, 1907.

Application filed May 16, 1907. Serial No. 374,003.

*To all whom it may concern:*

Be it known that I, WILLIAM H. COLDWELL, a citizen of the United States, residing at Newburgh, in the county of Orange and State of New York, have invented certain new and useful Improvements in Traction and Lawn-Rolling Rollers; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one form in which I have contemplated embodying my invention and said invention is fully disclosed in the following description and claims.

In the use of motor operated lawn mowers and rollers, considerable difficulty is experienced at times in securing the necessary traction of the driving rollers upon the lawn especially where the grass is wet, or when it is very hard and dry. The means ordinarily adopted in connection with traction wheels, on vehicles such as traction engines, are not applicable to a traction and lawn rolling roller for the reason that all such devices would indent, tear up or otherwise mar the lawn. It is desirable also that a combined traction and lawn roller be provided with means for preventing the roller from slipping sidewise, as when it is passing sidewise on a hill side. The extensive use of motor lawn mowers and rollers on golf courses, and estates having large lawns, makes it increasingly important to secure a combined traction and lawn rolling roller which will accomplish the two-fold results desired, to wit, prevent the slip of the roller, longitudinally and also transversely of the machine, and yet avoid any perceptible effect upon the lawn. After considerable experimentation on this subject, I have produced a combined traction and lawn rolling roller which is suitable for use in motor mowers, rollers and the like, in the use of which the desired results are fully accomplished and without in any way marring the lawn, or making any effect thereon which can be perceived by the eye.

In the accompanying drawings, Figure 1 represents a motor lawn mower and roller, having my invention embodied therein. Fig. 2 is a detail perspective view of the combined traction and lawn rolling roller. Fig. 3 is an enlarged view of a portion of the roller, partly in section.

In the drawings A represents the motor frame of a motor lawn mower and roller, supported upon the combined traction and lawn rolling roller B, and the lawn rolling and steering roller B', and provided with a suitable motor C, in this instance an explosion engine, which is connected by suitable mechanism (not shown) with the traction and lawn rolling roller B.

D represents the cutter frame, carrying the cutting mechanism, and connected by arms E with the motor frame so as to be pushed by and ahead of the latter.

The combined traction and lawn rolling roller B is shown in detail in Fig. 2, and it has its outer face which is for the most part smooth and cylindrical, provided with a plurality of very small projections $b$, which are circular and rounded over, forming segments of a sphere. These projections are located at suitable intervals over the entire cylindrical surface of the roller and are preferably cast or otherwise formed integrally therewith. The size and altitude of the projections is such that when the roller B passes over a lawn, they will leave no perceptible impression, while at the same time they prevent the slipping of the roller under the traction of the motor, and also prevent the roller from slipping endwise or transversely of the machine. In practice I find that by making the height of the projections $b$ about one half of their diameter, and separating them a distance equal to two or more times their diameter the best results are obtained, and I preferably make the projections about one quarter of an inch in diameter, one eighth of an inch in height and separate their centers about half an inch to an inch. It will be observed that as the projections are so nearly flat, and are so widely separated it is impossible for the spaces between them to fill up with dirt or grass, as their spherical surfaces causes them to clear themselves from foreign matter, and thus the roller will always have sufficient traction and the separation of these projections in all directions causes the roller to be held against slipping sidewise as well as straightaway. It is also found that in using this roller on comparatively barren parts of the lawn or field, where it is desired to sow grass seed, the projections $b$ leave minute pockets in bare earth, well calculated to receive the seed, and also to accumulate water after a rain, so that its use is desirable and advantageous in bringing barren spots up to the standard of the surrounding lawns. When used on good turf, however, as before noted the projections which sink merely into the grass, leave no effect on the lawn, as the grass rises as soon as the roller has passed over it.

What I claim and desire to secure by Letters Patent is:—

1. A traction and lawn rolling roller, having a plain cylindrical surface, provided with projections, separated from each other in all directions, and of such size as to provide traction without marring a lawn, substantially as described.

2. A traction and lawn rolling roller having a plain cylindrical surface, provided with projections separated from each other in all directions, and of such size as to provide traction without marring a lawn, said projections being in the form of a segment of a sphere, and having their altitude less than their diameter, substantially as described.

In testimony whereof I affix my signature, in the presence of two witnesses.

WILLIAM H. COLDWELL.

Witnesses:
HENRY W. MURTFELDT,
E. C. ROSS.